(12) United States Patent
Angelin et al.

(10) Patent No.: US 9,872,350 B2
(45) Date of Patent: *Jan. 16, 2018

(54) POWER SUPPLY UNIT AND RELATED LIGHTING SYSTEM

(71) Applicant: OSRAM GmbH, Munich (DE)

(72) Inventors: Francesco Angelin, Mogliano Veneto (IT); Paolo De Anna, Riese Pio X (IT); Bernd Rudolph, Forstern (DE)

(73) Assignee: OSRAM GMBH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,837

(22) Filed: Jan. 3, 2017

(65) Prior Publication Data

US 2017/0111966 A1 Apr. 20, 2017

Related U.S. Application Data

(63) Continuation of application No. 14/409,479, filed as application No. PCT/IB2013/055106 on Jun. 21, 2013, now Pat. No. 9,609,700.

(30) Foreign Application Priority Data

Jun. 25, 2012 (IT) .......................... TO2012A000558

(51) Int. Cl.
    *H05B 33/08* (2006.01)
(52) U.S. Cl.
    CPC ....... *H05B 33/0827* (2013.01); *H05B 33/089* (2013.01); *H05B 33/0815* (2013.01); *H05B 33/0845* (2013.01)

(58) Field of Classification Search
    CPC ............ H05B 33/0815; H05B 33/0809; H05B 33/0845; H05B 33/089
    See application file for complete search history.

(56) References Cited

U.S. PATENT DOCUMENTS

2004/0090189 A1* 5/2004 Yoneda .............. H05B 33/0848
                                                            315/291

OTHER PUBLICATIONS

Notice of Allowance based on U.S. Appl. No. 14/409,479 (11 pages) dated Jan. 11, 2017.

* cited by examiner

*Primary Examiner* — Douglas W Owens
*Assistant Examiner* — Pedro C Fernandez
(74) *Attorney, Agent, or Firm* — Viering, Jentschura & Partner mbB

(57) ABSTRACT

The Power Supply Unit comprises an output providing electrical power between a positive power supply line and a common ground line and a communication line. An adjustable current generator responsive to an internal measurement signal generates an output current at the output, and a voltage source is coupled to the communication line. A current measurement unit measures a current through the communication line and generates the internal measurement signal depending on the measured current through the communication line. Specifically, the Power Supply Unit is configured to determine the voltage drop on the common ground line by applying via the voltage source two different voltages to the communication line.

20 Claims, 6 Drawing Sheets

POWER SUPPLY UNIT AND RELATED LIGHTING SYSTEM

CROSS-REFERENCE TO RELATED APPLICATIONS

This is a continuation of copending application Ser. No. 14/409,479 filed on Dec. 19, 2014 which is a national stage entry according to 35 U.S.C. §371 of PCT application No. PCT/IB2013/055106 filed on Jun. 21, 2013, which claims priority from Italian Application No. TO2012A000558 filed on Jun. 25, 2012, and is incorporated herein by reference in its entirety.

TECHNICAL FIELD

The present disclosure relates to the field of Solid State Lighting, and describes an interface for a Light Engine Module to its Power Supply Unit and the Light Engine Module respective the Power supply unit. The present disclosure generally relates to a Power Supply Unit for driving one or more Light Engine Modules, in particular Light Engine Modules with light-emitting diode (LED) light sources, and a lighting unit including a Power Supply Unit and at least one Light Engine Module. More particularly, various inventive methods and apparatus disclosed herein relate to a self-adjusting Power Supply Unit for driving one or more Light Engine Modules with light-emitting diode (LED) light sources, and an LED-based lighting unit including a self-adjusting Power Supply Unit and at least one Light Engine Module.

BACKGROUND

Illumination devices based on semiconductor light sources, such as light-emitting diodes (LEDs), offer a viable alternative to traditional fluorescent, HID, and incandescent lamps. Functional advantages and benefits of LEDs include high energy conversion and optical efficiency, longer expected lifetime, lower operating costs, and many others.

In some applications, an LED-based lighting unit may include a Power Supply Unit which supplies an LED driving current to a plurality of Light Engine Modules, each including one or more LEDs. For example, an Light Engine Module may include a circuit board (e.g., a printed circuit board) having one or more LEDs mounted thereon. Such circuit boards may be plugged into slots in a lighting fixture, or a motherboard, on which the Power Supply Unit may be provided.

In various applications and installations, an LED-based lighting unit may include different numbers of LEDs and/or Light Engine Modules. For example, the number of LEDs and Light Engine Modules may be changed depending on the light output requirements, e.g. lumens, for a particular installation.

In general, the magnitude or level of the LED driving current output by a Power Supply Unit will need to be changed according to the number of LEDs and Light Engine Modules to which it is connected and which it drives. This means that if a single Power Supply Unit is going to be employed in a variety of LED-based lighting units with different numbers of LEDs and/or Light Engine Modules, then the Power Supply Unit will have to include a means or provision for adjusting the LED driving current to match the current driving requirements for the different Light Engine Modules according to the different numbers of light sources that they include. Meanwhile, the number of LEDs and Light Engine Modules to be included in a particular LED-based lighting unit is determined at the time of manufacturing that LED lighting unit. Thus, if the same Power Supply Unit is to be employed in a variety of LED lighting units with different numbers of Light Engine Modules, then the power supply unit would have to be programmed at the time of manufacturing for each different LED lighting unit so that its output LED driving current is appropriate for the particular number of Light Engine Modules that are included in that LED lighting unit.

This problem has been addressed by means of interfacing between Power Supply Unit and Light Engine Module.

Interfacing means that the Light Engine Module provides the Power Supply Unit with some information, regarding its needed current to fulfil flux specification and/or its working temperature, in order to reduce the supplied current level when a certain limit is exceeded. There are several ways in the Art to interchange this information between the Light Engine Module and the Power Supply Unit. Buses can be used to interchange such information. Known in the art are analog buses like the 0.10V bus or digital buses like the DALI (Digital Addressable Light Interface) bus. Also known in the Art are simple Resistor networks that can be measured by the Power Supply Unit and tell the Power Supply Unit the current requirements of the Light Engine Modules. DE 100 51 528 discloses such an interface where a specific Resistor is connected between a third wire and the negative supply line. If several Light Engine Modules are connected to one Power Supply Unit, the resistors are connected in parallel or serial, so a sum signal is given into the Power Supply Unit to define the current requirements. The German patent application 102011087658.8 discloses also resistors to define the current requirement of each Light Engine Module.

The bus solutions have the disadvantage of two extra wires needed. The resistor solutions only need one extra wire, but the evaluation of the resistor network and the current adjustment can be very complex.

Since complete Power Supply Unit and Light Engine Module systems have appeared on the market, different companies have tried to fix a way to make the two parts communicate; also some digital protocols have been used for the more complex and high-end systems, but this latter technique is out of the present disclosure's background, and have to be considered apart.

For instance, the company OSRAM has already proposed a three extra-wire interface, able to supply also power to an active Light Engine Module onboard circuitry which provides thermal derating. In this interface type a Light Engine Module onboard resistor forms a divider with a Power Supply Unit pull-up resistor, in order to develop a voltage which sets the Power Supply Unit output current. An operational amplifier on the Light Engine Module then starts to limit this voltage (so reduces the current) when the module overheats.

The company Philips has proposed a different extra-three wire interface, where one wire is connected to the current setting resistor, while another one is connected to a temperature sensing resistor, and the derating is done by the Power Supply Unit itself, not involving any active part on the Light Engine Module.

Both interfaces include a third extra wire for the common signal ground return, and use a voltage developed by the Light Engine Module resistor to set the current, in such a way that the greater voltage causes the greater output current.

Recently, the company OSRAM has come out with a slightly different interface, that actually is a 0.10V one customized with a precise current source in the Power Supply Unit to enable the Light Engine Module to use just a resistor to set the current.

Now a new request rises from the market, i.e. the capability of paralleling different modules to be supplied by the same Power Supply Unit. Obviously the Power Supply Unit's outputted current must be the sum of each Light Engine Module nominal value, and the thermal derating capability must be kept even for a multiple Light Engine Module arrangement.

As well, the market is asking for a cost cut, actually pointing to a wire number reduction. Bus-based interfaces normally need 4 wires, two for the power supply of the Light Engine Modules and two for the bus.

So a couple of new features to satisfy the needs have been postulated:

Multiple modules must be allowed to be connected in parallel using the same interface (of course the different modules are supposed to be identical, or at least to have the same string voltage).

The setting interface must have a reduced number of wires, and must be as simple as possible in order to reduce costs, especially at the Light Engine Module side.

All the known interfaces proposed up to now are not able to support multiple Light Engine Module connections, a new interface is proposed in order to fulfill all the newest requirements.

SUMMARY

In various embodiments, the way to provide the current requirement information is analog, i.e. by the magnitude of some electrical parameters directly set by the onboard circuitry of the Light Engine Module: these parameters are then recognized by the Power Supply Unit which adjusts its output current as demanded.

Hereafter both a concept and a possible implementation of a "one wire" analog interface are proposed, with "one wire" meaning that only one extra wire is need besides the two power wires.

Various embodiments are directed to a Light Engine Module including:

a plurality of series connected LEDs
a positive power supply line
a common ground line
a communication line where signals on the communication line are measured against the common ground line,
a current set resistor with its value proportional to the current demand of the Light Engine Module,
an amplifier responsive to a temperature sensitive input current,
a temperature sensitive resistor responsible for the temperature sensitive input current.

This Light Engine Module is easy and cheap to build and can handle different current demands and thermal derating over only one extra line.

The conductance of the current set resistor is preferably direct proportional to the current demand of said Light Engine Module. This eases the processing of the measured signal.

Additionally, the Light Engine Module is preferentially including a threshold set resistor responsible for a threshold level for thermal derating. This has the advantage of thermal derating only taking place at higher temperatures so no light will be lost in nominal operation.

The Light Engine Module may include also:

a voltage source with the negative output connected to common ground,
a series connection of the temperature sensitive resistor and the threshold set resistor connected in parallel to the voltage source,
a transistor where the base is connected to the node between the temperature sensitive resistor and the threshold set resistor, the collector is connected to the node between the positive output of the voltage source and the temperature sensitive resistor, the emitter is connected to the communication line via a emitter resistor.

This current source is capable of conducting a duration of the supplied current to substantially zero to protect the Light Engine Module.

The Light Engine Module may include in an alternative solution:

a voltage source with the negative output connected to common ground,
a series connection of the temperature sensitive resistor and the threshold set resistor connected in parallel to the voltage source,
a transistor where the base is connected to the node between the temperature sensitive resistor and the threshold set resistor, the emitter is connected via a emitter resistor to the node between the positive output of the voltage source and the temperature sensitive resistor, the collector is connected to the communication line.

In another embodiment the voltage source is derived from the two power supply lines.

In a further embodiment the voltage source is connected with common ground and tapped between a portion of the plurality of series connected LEDs.

Various embodiments are also directed to a Power Supply Unit including:

an output providing electrical power between a positive power supply line and a common ground line,
a communication line where signals on the communication line are measured against the common ground line,
an adjustable current generator responsive to an internal measurement signal generating an output current at the output,
a voltage source coupled to the communication line,
a current measurement unit generating the internal measurement signal.

This allows an easy and cheap Power Supply Unit with adequate precision.

In a first embodiment the current measurement unit includes a current measurement resistor and an operational amplifier.

In a second embodiment the Power Supply Unit has the following attributes:

the voltage source is connected between common Ground and the positive input of the operational amplifier,
the current measurement resistor is connected between the negative input of the operational amplifier and the output of the operational amplifier,
the communication line is connected to the negative input of the operational amplifier,
the output of the operational amplifier outputs the internal measurement signal.

This enhances the precision and leads to a cheap and precise power source.

In a further embodiment the voltage source is adjusted in a way, that every single Light Engine Module can decrease the supplied current to substantially zero. This protects the Light Engine Modules.

In a further embodiment the Power Supply Unit conducts linear characteristic between the internal measurement signal and the output current of the adjustable current generator. This leads also to an easy and cheap measurement unit.

In a still further embodiment the linear characteristic takes place only over a portion of the total range of the internal measurement signal. This generates a threshold for the temperature derating.

In a still further embodiment the beginning of the portion is defined by an offset voltage of the internal measurement signal, and below this offset voltage no current will be provided by the adjustable current generator. This also is good for the temperature degradation.

In another embodiment the offset voltage is identical to the value of the voltage source. This leads to an easy implementation.

In another further embodiment the value of the current measurement resistor is defined by the maximum current output of the adjustable current generator. This helps to scale the Power Supply Unit in regard to the current capabilities.

Various embodiments are also conducted to a lighting system, including:
 a Power Supply Unit;
 at least one Light Engine Module;
 wherein the Power Supply Unit and the Light Engine Module have an interface as described above, providing information to the Power Supply Unit on the current demand of the connected Light Engine Modules.

In a first embodiment of the lighting system the Power Supply Unit includes an identification voltage source supplying a Light Engine Module identification voltage and measuring the corresponding identification current. This leads to an easy and cheap interface between the Power Supply Unit and the Light Engine Module.

In a second embodiment all Light Engine Modules are connected in parallel. This leads to a very simple handling for the customer.

As anticipated, the features of this analog interface are:
 To tell the Power Supply Unit which is the nominal supply current of the Light Engine Module.
 To reduce the supplied current e.g. when the temperature is higher than expected. This is sometime referred as "thermal derating", and it is an event caused by unpredictable reasons.

BRIEF DESCRIPTION OF THE DRAWINGS

In the drawings, like reference characters generally refer to the same parts throughout the different views. The drawings are not necessarily to scale; emphasis instead generally being placed upon illustrating the principles of the disclosed embodiments. In the following description, various embodiments described with reference to the following drawings in which.

DETAILED DESCRIPTION

The following detailed description refers to the accompanying drawing that show, by way of illustration, specific details and embodiments in which the disclosure may be practiced.

In the following, several embodiments of the inventive concept will be described. The inventive concept always deals with a three wire interface, where several Light Engine Modules can be connected in parallel to a Power Supply Unit and the current requirements of every Light Engine Module match.

First Embodiment: Analog Circuit

Figure 1:
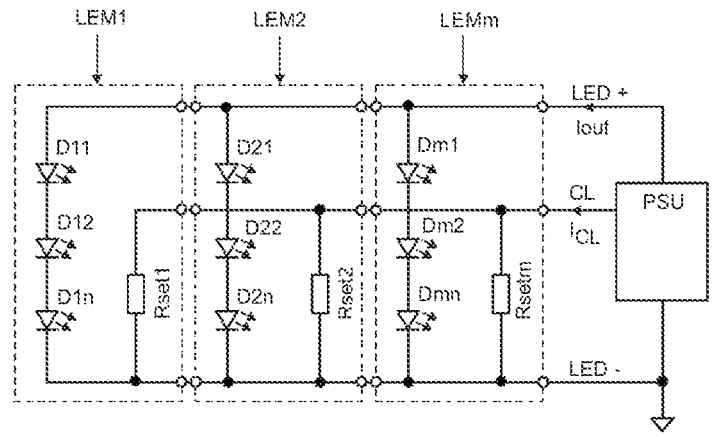
FIG. 1 shows the paralleling concept of current set resistors.

The basic idea of having a resistor to set the current has been kept, but the inventive concept of using it is different. FIG. 1 shows the general paralleling concept of current set resistors. Three Light Engine Modules LEM connected to a Power Supply Unit PSU are shown. The connection consists of three lines: A supply line LED+, a common ground line LED− and a communication line CL. Each Light Engine Module contains at least one LED string. The LED string consists of a plurality of LEDs. A plurality in the light of the disclosure means that there are at least three LEDs connected in series. Each Light Engine Module also contains a current set Resistor Rset. The current set Resistors are connected between the common ground line LED− and the communication line CL. This leads to a parallel connection of each current set Resistor Rset1, Rset2, Rsetm, so the Power Supply Unit PSU measures the equivalent resistance of that parallel connection. The concept is to have the Power Supply Unit PSU reading not a voltage as in the related art, but a current representative for the resistance value. Then an inverse law is applied to the resistance value to set the Power Supply Unit's output current. The law is as follows:

$$I_{Output} = \frac{Kv}{R_{Set}}$$

Kv has the dimension of a voltage.

By doing so, the Power Supply Unit's output current is inversely proportional to the Light Engine Module current set resistor value Rset, i.e. the smaller the resistance, the higher the output current of the Power Supply Unit PSU.

This intrinsically satisfies the requirement of having a final current equal to the sum of each single Light Engine Module one, according to the well-known Ohm's law.

Figure 2:
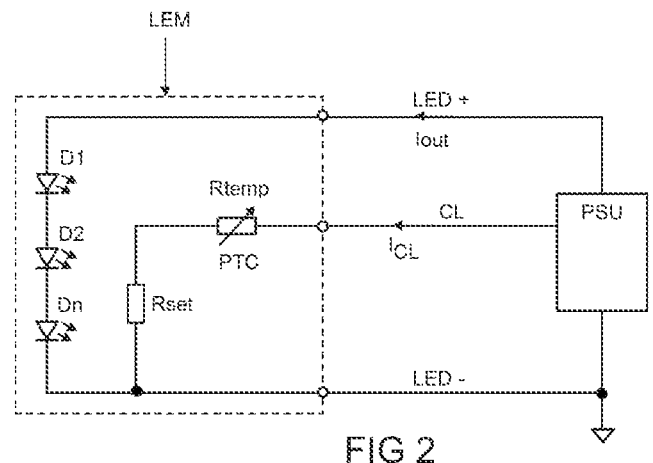
FIG. 2 shows a simple solution for thermal derating.

FIG. 2 shows a concept schematic of an interface with a thermal derating capability. This adds a very simple thermal derating by putting a PTC element in series with Rset. As the temperature of the Light Engine Module LEM rises, the value of the PTC also rises leading to a smaller current for that module. The disadvantage of such an arrangement is that it won't be adequate for a multiple Light Engine Module connection, because a single PTC action would take away from the sum of the parallel connected resistors Rset only that member's contribute, and this could be not enough to reduce the suffering Light Engine Module's temperature enough.

Anyhow this solution could be kept for very low-cost applications, when a partial current reduction in the event of overheating is still acceptable.

Furthermore, a simple temperature element in series with the current setting resistor has the disadvantage of continuously derating the current, without having a precise starting point for the derating itself (even if some PTC elements have a very steep behavior around the trigger temperature). So the "nominal" current setting would be corrupted by a "parasitic" effect of the derating element.

Figure 3:
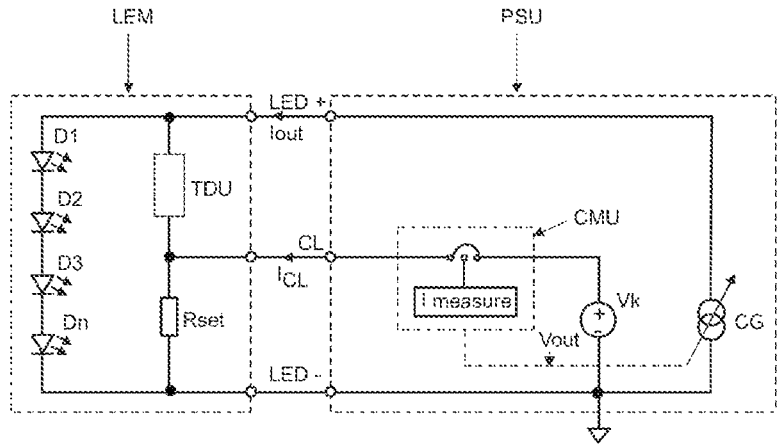
FIG. 3 shows the complete concept of the present disclosure with the thermal derating unit TDU.

FIG. 3 shows the inventive concept of an interface with a thermal derating unit TDU.

The concept relies on a different approach, by adding an extra current generator TDU onboard the Light Engine Module. This current generator is temperature controlled by a sensing element, and takes power directly from the Light Engine Module's power line, in order to avoid extra wires for the interface. The current generator includes a temperature sensitive resistor generating an input current and an amplifier amplifying that input current to the generated current $I_{TDU}$. The generator is arranged with a threshold which inhibits any current injection until a certain overtemperature of the Light Engine Module is achieved. Then the slope of current versus temperature (gain of $I_{TDU}$) is high enough for the system to try to stabilize the max working temperature of the Light Engine Module, but not so to trigger instabilities due to heat transmission time lags. The current generator is able to override completely the signal generated by the paralleled resistors Rset: in such a way it can safely protect the whole system and especially its own Light Engine Module even in case of multiple Light Engine Module connection together with a very concentrated overheating.

With the temperature dependent current generator a new problem arises. It is necessary to measure Rset independent of the actual temperature of the module and therefore independent of the provided current of the current generator. The way to measure Rset out must be fixed in order to make the action of the current generator predictable.

In various embodiments, the disclosure uses a fixed voltage generator Vk to measure the resistance value, by putting this voltage across the resistor Rset (or their parallel) and then reading the current flowing through it. This in turn makes the current generator TDU directly interacting with the current fixed by Vk on Rset, resolving the final behavioral law.

Figure 4A:
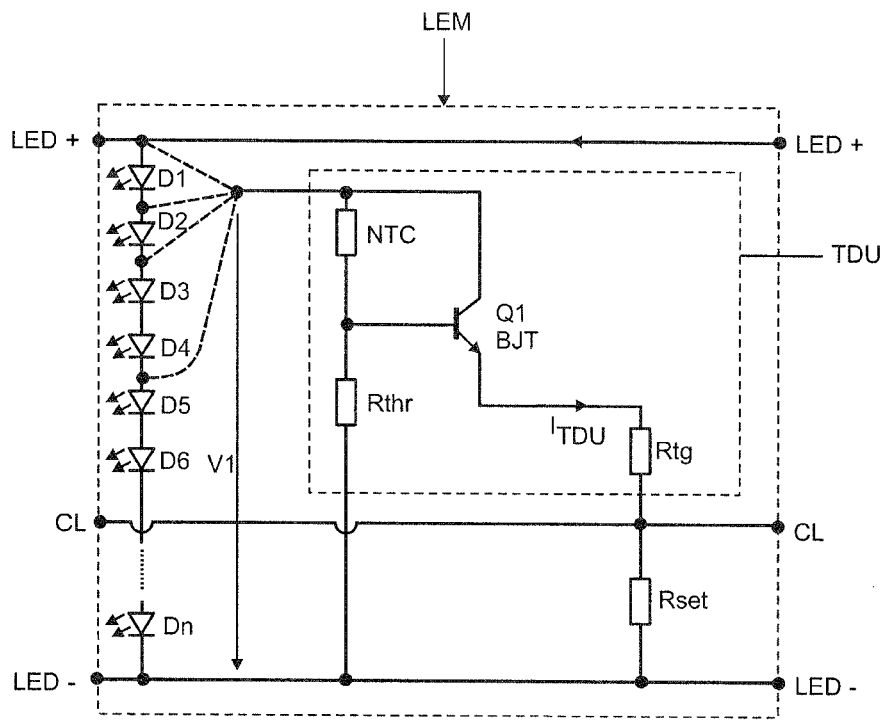
FIGS. 4A and 4B show a very simple TDU implementation.

FIG. 4A shows a first embodiment of the Light Engine Module providing the inventive interface, with just one bipolar transistor, an NTC element and a couple of added resistors.

The circuit contains a voltage source V1, which is derived from the supply line LED+ of the LED module. LEDs have a quite stable flux voltage, so this can serve as a voltage source "good enough". Dependent of the supply voltage needed for TDU, the voltage source V1, always connected to common ground LED−, can be tapped between a portion of the plurality of series connected LEDs. This means, the voltage V1 can be adjusted in a way that it represents a multiple value of a single LED flux voltage. In parallel to this voltage V1 there is a series connection of the NTC and a threshold resistor Rthr. The base of a NPN Bipolar Junction Transistor (BJT) Q1 is connected to the node between the NTC and Rthr. The collector of Q1 is connected to the voltage V1. The Emitter of Q1 is coupled to the communication line via an emitter resistor Rtg. All these components of FIG. 4a described above are forming the thermal derating unit TDU.

The current set Resistor Rset is connected between the rail-wise positioned CL and common ground LED− lines of the power supply.

In this circuit the potential of Q1's emitter is referred to a forced voltage (by definition Vk) in the Power Supply Unit PSU that realizes the threshold below which no current $I_{TDU}$ is injected into the CL line. When the temperature rises, the NTC starts to raise the base potential, until moving Q1 into the active region. Now the emitter resistor Rtg sets the gain of the circuit TDU, and fixes the slope of the injected current $I_{TDU}$ versus temperature.

The resistor Rthr, together with the NTC at the temperature trigger specified for the TDU, sets the thermal derating starting point in relation to the voltages V1 and Vk.

A further advantage of this arrangement is the good linearity of the current $I_{TDU}$ versus temperature achievable.

One of the most interesting advantages of the disclosure, besides the easiness of the implementation on the Light Engine Module side, is its capability to be used in different quality grade systems, by adjusting the wanted accuracy and features only by scaling the Power Supply Unit interface's circuitry complexity. In other words, it's possible to build the reading interface on the Power Supply Unit side according to the requested accuracy and/or extended features needed.

Figure 4B:
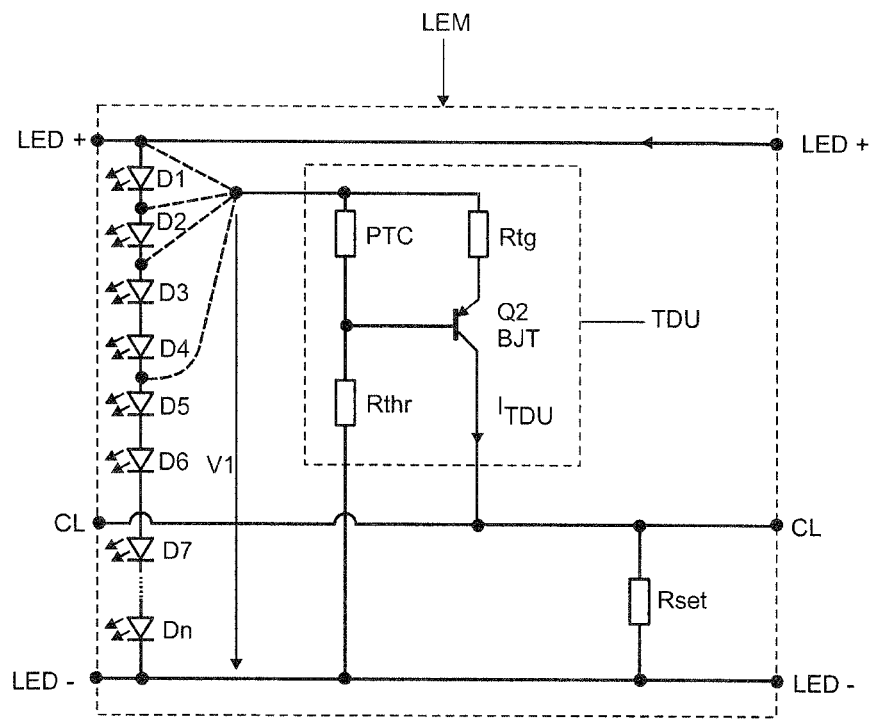

FIG. 4B shows a second embodiment of the Light Engine Module LEM interface with a dual implementation. Here a PNP-Type Transistor Q2 is used together with a PTC. A PTC is a temperature sensitive resistor with a positive temperature coefficient. The voltage V1 is derived from either the whole number of series connected LEDs or a portion of the series connected LEDs. In contrary to the embodiment of FIG. 4A, the collector of Q2 is providing the current source characteristic producing the current $I_{TDU}$, and is connected to CL. Thus the temperature derating threshold is not depending on Vk but only on V1 and the values of the voltage divider formed by the temperature sensitive resistor PTC and the threshold resistor Rthr.

Thus, in the embodiments discloses in the forgoing the Light Engine Module LEM includes a set resistor Rset to specify the nominal current and a thermal derating unit TDU, which generate a current as a function of the temperature of the Light Engine Module LEM. Specifically, in the embodiments shown in FIGS. 4A and 4B, a bipolar transistor is used to amplify the current through a temperature sensitive resistor. However, in general, also other variable current generators could be used.

Moreover, the current generated by the unit TDU could also depend on other parameters. For example, also other sensors could be used to vary the current generated by the unit TDU, e.g.:

a light sensor configured to detect the ambient luminosity; e.g. in order vary the light generated by the Light Engine Module LEM as a function of the ambient light, e.g. in order to keep the total light quantity substantially constant;

a twilight light sensor, e.g. for activating or deactivating the Light Engine Module LEM as a function of the ambient light;

a movement sensor, such as a Passive InfraRed (PIR) sensor, e.g. for activating or deactivating the Light Engine Module LEM only in the presence of humans; and/or a wireless receiver for receiving a signal form a remote control.

The unit TDU may also include a plurality of such sensors in order to implement different functions. For example, in an embodiment, the unit TDU may include a digital processor, such as a microprocessor, wherein at least one sensor is connected to the processor via an analog to digital converters and the processor generates the output current via a programmable current generator. For example, in this way, more complex control functions could be implemented.

Finally, instead of performing a tapping between a portion of the plurality of series connected LEDs, the supply signal for the unit TDU may also be obtained in a different manner. For example, the supply signal for the unit TDU may be generated by a current or voltage generator connected directly to the supply line LED+. Moreover, in principle, the supply signal could also be derived from the voltage Vk.

Thus, the Light Engine Module LEM disclosed herein includes a passive component (i.e. the resistor Rset), which specifies the nominal current requirements, and an active current generator, which generates a compensation current, thus modifying the current $I_{CL}$ flowing through the control line CL. Specifically, in various embodiments, this compensation current is determined as a function of certain operation conditions detected by means of one or more sensors. Due to the fact that the power supply unit PSU varies the supply current for the Light Engine Module LEM as a function of the current $I_{CL}$ flowing through the control line CL, the current generator of the unit TDU may modify the current requirements of the Light Engine Module LEM.

Figure 5:
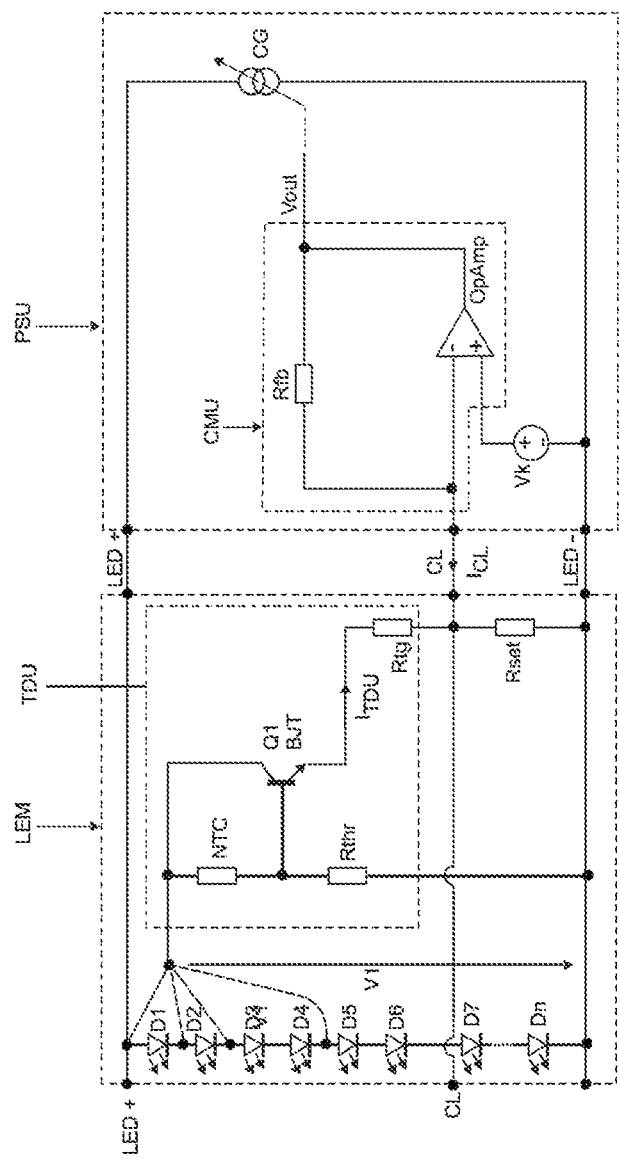
FIG. 5 shows a simple system implementation. $V_{out}$ is the internal voltage representing the output current.

FIG. 5 shows an embodiment of the Power Supply Unit's PSU interface. This is a very simple circuit for cheaper Power Supply Units, where no high accuracy is needed.

Due to the requirement of reduced connection lines and the concept of a common ground line LED−, the problem of voltage drop on that common Ground line LED− due to the Light Engine Module current(s) for the LEDs arises. The embodiment adopts a very simple circuit based on a single operational amplifier, without any compensation of the ground line offset due to the Light Engine Module current. The Power Supply Unit interface includes an operational Amplifier OpAmp, where its negative input is connected to the communication line CL. The output generates an internal measurement signal Vout, which is used to adjust the current Tout provided at the output of the Power Supply Unit. The output of the Power Supply Unit is connected to LED+ and LED− of the Light Engine Module. A current measurement resistor Rfb is connected between the output and the negative input of the operational amplifier OpAmp, thus forming its mandatory negative feedback. A voltage source Vk is connected between the positive input of the operational amplifier OpAmp and the common ground line LED−, thus forming the reference for the PSUs interface.

Actually, just by choosing an adequate value for Vk, the measuring error can be reduced until a reasonable value for the application. For example, stating a 50 mV max voltage drop on the ground path (1 A on a 50 mOhm connection), a 5V voltage is the minimum value for Vk to have an error due to the voltage drop of under 1%.

To achieve a better accuracy, different compensating techniques for that common ground line offset may be applied. One of the simplest is of course to switch-off the Light Engine Module string before to read out Rset: this can be done at the system start-up by a simple machine based on a sample & hold system.

It must be noticed that when the Light Engine Module string is turned off by removing the supply on the LED+ wire, the current level on the communication line CL is not affected by the temperature signal. This is not a disadvantage, because this information is not needed when the Light Engine Modules are completely turned off, rather it is a way to read the Rset value not only with a better accuracy, but also without any deviation due to a possible overheating, respective without any deviation due to the Light Engine Module temperature.

On the other hand, also the opposite way is viable. This means that the pure temperature information is available by simply separating the reference voltage Vk from the OpAmps positive input. Doing so makes the voltage on the third wire be a function of solely the Light Engine Module temperature (the highest one in case of multiple connection), even in case it's lower than the derating threshold. This makes the Power Supply Unit able to derate itself the current to the Light Engine Module(s), according its proper law, and allows to know the working temperature of the Light Engine Module(s) even when not overheated (of course Rset must be known to achieve the best temperature accuracy).

Figure 6:
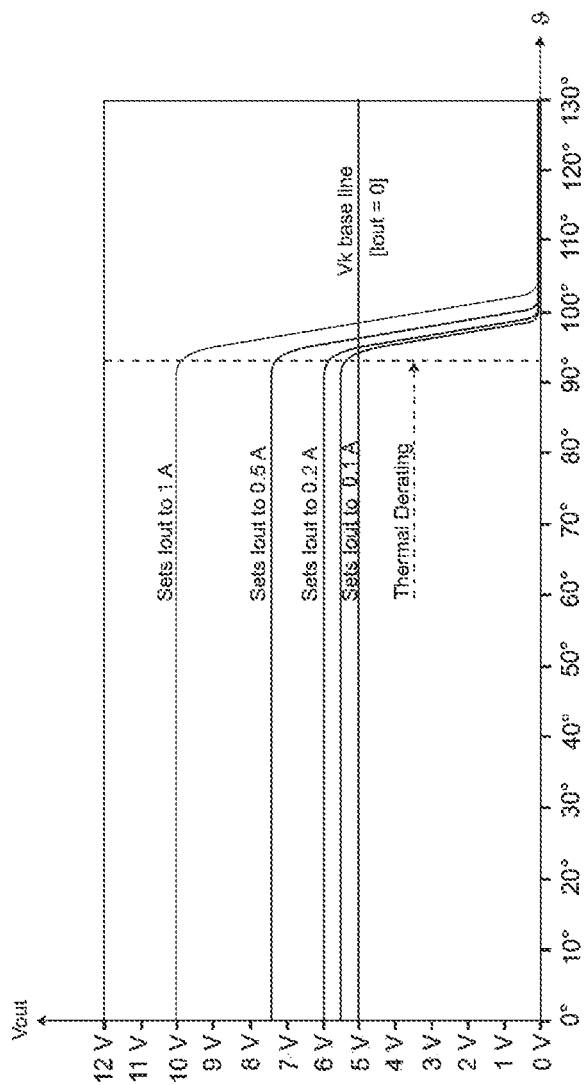
FIG. 6 shows a simulation graph of the circuit of FIG. 5.

FIG. 6 shows a derating curve of the inventive Power Supply Unit. The curve shows the internal control voltage Vout of the Power Supply Unit over the temperature of the Light Engine Module(s). The multiple curves relate to the different current requirements of the connected Light Engine Module(s). It can be seen that the derating starts at a temperature of about 93° C. until about 100° C. to 104° C. the power is shutdown completely.

The function of the inventive interface will be explained in the following with the help of a practical example.

As can be seen in the figure, an output current of 1 A results in an internal measurement signal Vout of 10 V. The interface shall be designed in a way, that a conductance of 1 mS for Rset results in an Output current of 1 A. According to the figure, the voltage source Vk is adjusted to 5 V. This means, that 5V are applied to Rset (see FIG. 5). The operational Amplifier works in a way to minimize the signal Level on its inputs, so it will work until the level at the positive input is the same like the level at the negative input. So if Vk has 5V, this means that 5V will also be at the negative input of the operational amplifier. This leads to 5V at the current set resistor Rset, resulting in a current through the communication line CL of 5 V/1 kOhm=5 mA. 5 mA through the communication line CL means that these 5 mA also flow through the current measurement resistor Rfb, because the input of the operational amplifier has a high impedance and therefore no current consumption As the voltage of the internal measurement signal Vout shall be 10 V according to FIG. 6, the voltage over the current measurement resistor Rfb has also to be 5 V resulting in a current measurement resistor Rfb with a value of also 1 kOhm respective 1 mS.

According to this example, a Light Engine Module with a current requirement of 2 A would have a current set resistor Rset of 2 mS, that is 500 Ohms.

As mentioned above, the inventive three wire interface with the concept of the measuring current returning through the common ground line together with the LED current has the disadvantage of corrupting the measuring signal with the voltage drop on the common ground line LED− due to the Light Engine Modules' current flowing through it, but with a proper strategy it is possible to compensate this effect in order to retrieve the true value for the Power Supply Unit.

Figure 7:
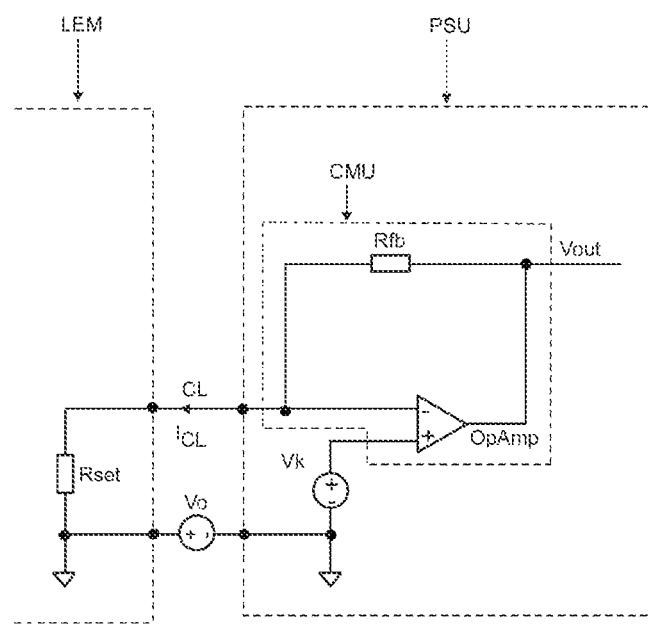
FIG. 7 shows a schematic circuit of how to model the cable voltage drop due to LED current.

FIG. 7 shows a schematic circuit of how to model the cable voltage drop Vo due to LED current.

The general method to compensate the voltage drop is to vary the Vk voltage of the voltage source in the Power Supply Unit. The voltage drop can be cleared out by a linear equation system based on two different values of Vk. Raising the Vk voltage beyond V1 inside the Light Engine Module makes the Rset value uncorrupted by the temperature information (whichever it could be) without turning off the Light Engine Module power.

As shown in FIG. 7, the voltage drop on the common return LED− can be modelled as a voltage generator Vo in series with Rset: The circuit is similar to the circuit in FIG. 5 with the temperature section left out and added offset generator Vo, which is representing the voltage drop on the cable.

Now the circuit's equation is formulated by simply considering both Op Amp inputs are at the same voltage:

$$\frac{V_{out} - V_k}{R_{fb}} = \frac{V_k - V_o}{R_{set}},$$

or, equivalently, $$\frac{R_{set}}{R_{fb}}(V_{out} - V_k) = V_k - V_o. \quad [1]$$

Now, calling $$K_R = \frac{R_{set}}{R_{fb}},$$

we can solve [1] into $V_o$ (constant), and apply two different values for $V_k$:

$$\begin{cases} V_o = V_{k,1} - K_R(V_{out,1} - V_{k,1}) \\ V_o = V_{k,2} - K_R(V_{out,2} - V_{k,2}) \end{cases} \quad [2]$$

It is possible to solve this linear system by equation comparison, finally having:

$$V_{k,1} - V_{k,2} = K_R(V_{out,1} - V_{k,1} - V_{out,2} + V_{k,2}) \quad [3]$$

This equation can also be written in terms of differences $\Delta V = V_1 - V_2$ and solved into $K_R$:

$$K_R = \frac{\Delta V_k}{\Delta V_{out} - \Delta V_k} \quad [4]$$

This expresses the ratio between the known and the unknown resistors as a ratio of superimposed (Vk) and measured (Vout) voltage differences.

As can be seen, the voltage drop $V_O$ can be computationally eliminated by two measurements and some mathematics.

Figure 8:
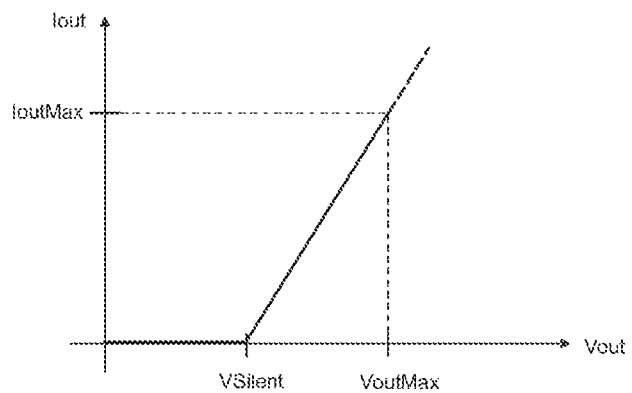
FIG. 8 shows a characteristic of the Current Generator.

FIG. 8 shows a characteristic of the Current Generator according to the example of FIG. 6. The graph shows the input of the Current Generator CG, the internal measurement signal Vout, against the output current of the Current Generator CG Tout. It can be seen, that under a certain voltage, here called Vsilent, no Output current is provided. At the maximum of the internal measurement signal Vout-Max, the maximum specified output current of the Current Generator CG is provided. Vsilent is the voltage up to where no current flows on the communication line CG. This can be due to the voltage Vk or due to the Temperature Derating Unit TDU creating a current $I_{TDU}$ similar to the current created by Vk, but in the opposite direction. So this current creates a voltage over Rset similar to VK, therefore no current flows over the communication line CL.

Under normal circumstances, a lighting system would be designed in a way that no current is provided by the Current Generator CG if no current flows over the communication line CL. This is because if the condition of a miswiring or a weak contact exists, no power should be provided from the Power Supply Unit PSU to the Light Engine Modules LEM. But under certain circumstances, this provision can be amended.

For normal circumstances, if no power should be provided from the Power Supply Unit PSU to the Light Engine Modules LEM, when no current flows on the communication line CL, the Voltage Vsilent is the same as the Voltage Vk.

Figure 9:
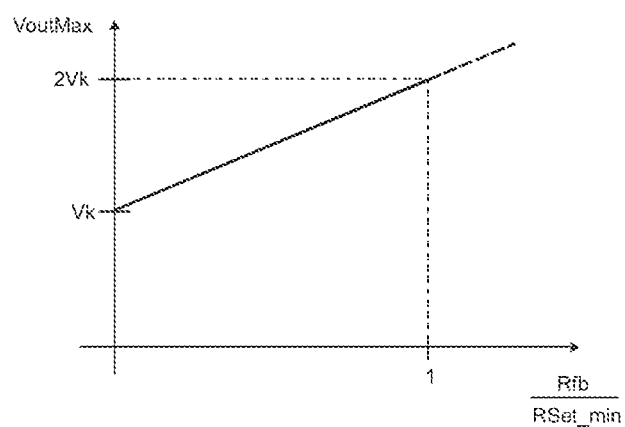
FIG. 9 shows a characteristic of the Current Measurement Unit.

FIG. 9 shows a characteristic of the Current Measurement Unit CMU. A main part of the Current Measurement Unit CMU is the current measurement resistor Rfb. The characteristic shows the output of the Current Measurement Unit CMU, the internal measurement signal Vout, against the normalized current measurement resistor Rfb/RsetMin. RsetMin is the minimal Value leading to the maximal specified output current IoutMax of the Power Supply Unit PSU. So at the value 1, when Rfb=Rsetmin, the Power Supply Unit provides maximal current and Power at its output, and the internal measurement signal Vout is 2*Vk as described in the example of FIG. 6.

In various embodiments of the inventive interface allows to acquire:

A composite information from the Light Engine Module, i.e. a nominal current derated by over-temperature, or A split information about nominal current and working temperature by properly switching the different generators inside the Power Supply Unit. This of course involves a logic circuit, and it's not as simple as reading a composite, non-compensated value from the communication line CL.

These are different approaches to read the Light Engine Module communication line CL, but the electronics inside the module stays the same.

These and other advantages of the disclosure are summarized in the following:

The inventive interface uses only a simple resistor to set the required current.

Only one extra wire is required besides the power connection to the Light Engine Modules.

More Light Engine Modules are allowed to be connected in parallel on the same bus interface.

The thermal derating can be realized by only adding a simple PTC or four cheap components.

The auxiliary supply for thermal derating is simply derived from a Light Engine Module string tapping.

The interface is intrinsically fail-safe, in the sense that, if Rset is broken or the communication line disconnected (the most likely fault events), the output current is switched off.

In case of short-circuit fault between Light Engine Module+ and the third wire (could be a wrong connection), the output current is intrinsically switched off, so also preserving the interface circuitry itself.

The Thermal derating unit doesn't drain current from Light Engine Module's supply until Light Engine Module overheating.

The current used to read out Rset can be varied according to the Power Supply Unit rating, in order to limit its ranging (and improve accuracy) according to the expected applied load.

The inverse Ohm law allows to keep a constant percentage resolution of output current.

The accuracy on reading out Rset depends on the complexity of the Power Supply Unit side interface, which can be arranged according to expected system quality grade. Furthermore, the reading of Rset may be ratiometric to a reference resistor inside the PSU, without requiring accurate voltage or current sources as in the related art.

The invented interface may provide different information according the applied stimulus, ranging from a single thermal derated current to two independent and accurate values of nominal current and working temperature.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

REFERENCE CHARACTER LIST

PSU Power Supply Unit
LEM Light Engine Module
CMU Current Measurement Unit
TDU Temperature Derating Unit
PGU Pulse Generation Unit
PG Pulse Generator
CL communication line
CG Current Generator
Vout internal measurement signal
Rset current set resistor
Rthr threshold set resistor
Rtg emitter resistor
Rfb current measurement resistor
Rp Pulse Resistor
LED+ positive power supply line
LED− common ground line
V1 voltage source
Vk voltage source
Vout internal measurement signal
S pulse switch

What is claimed is:

1. A Power Supply Unit comprising:
an output providing electrical power between a positive power supply line and a common ground line,
a communication line,
an adjustable current generator responsive to an internal measurement signal generating an output current at the output,
a voltage source coupled to the communication line,
a current measurement unit, measuring a current through the communication line and generating the internal measurement signal depending on the measured current through the communication line,
wherein said Power Supply Unit is configured to determine the voltage drop on said common ground line by applying two different voltages to said communication line via said voltage source, and
wherein said Power Supply Unit is configured to power at least one Light Engine Module comprising:
a plurality of LEDs connected in series between said positive power supply line and said common ground line, and
a current set resistor with its value of conductance being indicative for the current demand of the Light Engine Module, wherein said current set resistor is connected between said communication line and said common ground line.

2. The Power Supply Unit of claim 1, where the current measurement unit comprises a current measurement resistor and an operational amplifier.

3. The Power Supply Unit according to claim 2, where:
the voltage source is connected between the common ground line and a positive input of the operational amplifier,
the current measurement resistor is connected between a negative input of the operational amplifier and an output of the operational amplifier,
the communication line is connected to the negative input of the operational amplifier,
the output of the operational amplifier outputs the internal measurement signal.

4. The Power Supply Unit according to claim 1, wherein a linear characteristic exists between the internal measurement signal and the output current of the adjustable current generator.

5. The Power Supply Unit according to claim 4, wherein the linear characteristic is valid only over a portion of the total range of the internal measurement signal.

6. The Power Supply Unit according to claim 5, wherein the beginning of the portion is defined by an offset voltage of the internal measurement signal, and below the offset voltage no current is provided by the adjustable current generator.

7. The Power Supply Unit according to claim 6, wherein the offset voltage is identical to the value of the voltage source.

8. The Power Supply Unit according to claim 1, wherein the at least one Light Engine Module further comprises a variable current generator connected to said communication line and generating a compensation current, thus modifying the current flowing through said communication line, said variable current generator being responsive to at least one measurement signal provided by at least one sensor.

9. The Power Supply Unit according to claim 8, wherein said Power Supply Unit is configured to read the value of said current set resistor when said output current at said output is turned off.

10. The Power Supply Unit according to claim 8, wherein said Power Supply Unit is configured to measure the current generated by said variable current generator of said Light Engine Module when said output voltage of said voltage source is deactivated.

11. The Power Supply Unit according claim 8, wherein the voltage source is adjusted in a way that-each Light Engine Module can decrease the supplied current to substantially zero.

12. A lighting system, comprising:
a Power Supply Unit comprising:
an output providing electrical power between a positive power supply line and a common ground line,
a communication line
an adjustable current generator responsive to an internal measurement signal generating an output current at the output,
a voltage source coupled to the communication line,
a current measurement unit, measuring a current through the communication line and generating the internal measurement signal depending on the measured current through the communication line,
wherein said Power Supply Unit is configured to determine the voltage drop on said common ground line by applying two different voltages to said communication line via said voltage source; and at least one Light Engine Module, the Light Engine Module comprising:

the positive power supply line, the common ground line, a plurality of LEDs connected in series between said positive power supply line and said common ground line, the communication line, a current set resistor connected between the communication line and the common ground line, with its value of conductance being indicative for the current demand of the Light Engine Module, a variable current generator connected to said communication line and generating a compensation current, thus modifying the current flowing through said communication line, said variable current generator being responsive to at least one measurement signal provided by at least one sensor.

13. The lighting system according to claim 12, wherein said variable current generator comprises:

an amplifier responsive to a temperature sensitive input current, a temperature sensitive resistor responsible for the temperature sensitive input current.

14. The lighting system according to claim 13, said Light Engine Module further comprising a threshold set resistor responsible for a threshold level for thermal derating.

15. The lighting system according to claim 12, said Light Engine Module comprising:

a voltage source with the negative output connected to the common ground line, a series connection of the temperature sensitive resistor and the threshold set resistor connected in parallel to the voltage source, a transistor where the base is connected to the node between the temperature sensitive resistor and the threshold set resistor, the collector is connected to the node between the positive output of the voltage source and the temperature sensitive resistor, the emitter is connected to the communication line via an emitter resistor.

16. The lighting system according to claim 14, said Light Engine Module comprising:

a voltage source with the negative output connected to the common ground, a series connection of the temperature sensitive resistor and the threshold set resistor connected in parallel to the voltage source, a transistor where the base is connected to the node between the temperature sensitive resistor and the threshold set resistor, the emitter is connected via a emitter resistor to the node between the positive output of the voltage source and the temperature sensitive resistor, the collector is connected to the communication line.

17. The lighting system according to claim 16, where the voltage source is derived from the two power supply lines.

18. The lighting system according to claim 16, where the voltage source connected with common ground and tapped between a portion of the plurality of series connected LEDs.

19. The lighting system according to claim 12, wherein said at least one sensor comprises:

a temperature sensor configured to detect the temperature of said Lighting Engine Module and/or said plurality of series connected LEDs;

a light sensor configured to detect the ambient luminosity;

a twilight light sensor;

a movement sensor; and/or a wireless receiver for receiving a signal from a remote control.

20. The lighting system according to claim 12, wherein each Light Engine Modules are connected in parallel.

* * * * *